Feb. 10, 1970  R. P. LEHMANN ET AL  3,494,430
ROTARY POWER TOOL HAVING ROTATION REVERSING AND SHUTOFF MEANS
Filed July 25, 1968  3 Sheets-Sheet 1

INVENTORS
**RICHARD P. LEHMANN
ROBERT J. SECCOMBE**

BY

ATTORNEY

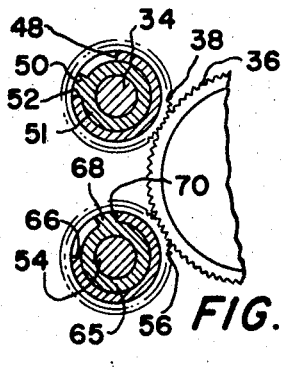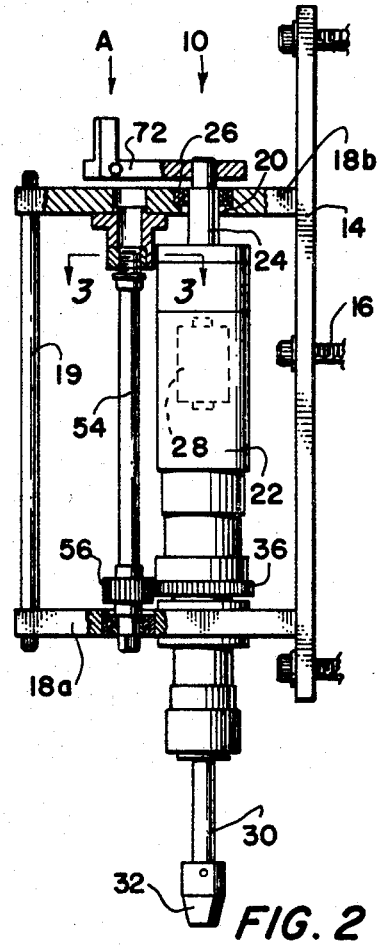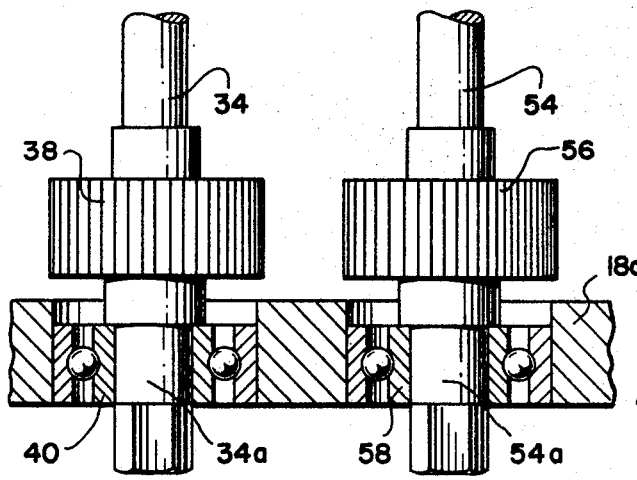

INVENTORS
RICHARD P. LEHMANN
ROBERT J. SECCOMBE

# United States Patent Office 3,494,430
Patented Feb. 10, 1970

3,494,430
ROTARY POWER TOOL HAVING ROTATION REVERSING AND SHUTOFF MEANS
Richard P. Lehmann, Kingsford, and Robert J. Seccombe, Dearborn Heights, Mich., assignors to Ingersoll-Rand Company, New York, N.Y., a corporation of New Jersey
Filed July 25, 1968, Ser. No. 747,747
Int. Cl. B25b 23/14
U.S. Cl. 173—12        7 Claims

ABSTRACT OF THE DISCLOSURE

A power operated nut runner including a rotatably mounted casing containing a reversible rotary motor, and a driven element or spindle rotatable by the motor in alternative opposing rotary directions. Measuring means are provided for measuring reactive torque on the casing during rotation of the driven element; and the motor is reversed and shutoff by control means responsive to such reactive torque on the casing.

---

The present invention relates to power operated tools and more specifically to power operated tools of the type including a rotatable driven element.

An object of the present invention is to provide a new and improved power operated tool which is particularly constructed and arranged whereby the rotation of a driven element is controlled in response to reactive torque on a reaction means during the rotation of the driven element.

Another object of the invention is to provide a new and improved power operated tool which is particularly constructed and arranged whereby the rotation of the driven element is both reversed and stopped in response to said reactive torque.

These objects, and those other objects and advantages of the invention which will be apparent from the following description taken in connection with the accompanying drawings, are attained by the provision of a power operated tool in general comprising driving means, a driven element connected to the driving means to be rotated thereby in alternative opposing rotary directions, and reaction means rotatably mounted and arranged whereby rotation of the driven element urges the reaction means in the opposing rotary direction. A means is operable, when the driven element is rotated to urge the reaction means in one rotary direction, for measuring torque in such one rotary direction on the reaction means; and a means is operable, when the driven element is rotated to urge the reaction means in the other rotary direction, for measuring torque in such other rotary direction on the reaction means. A control means is responsive to the torque on the reaction means in both rotary directions for controlling the rotation of the driven element.

Referring to the drawings:

FIG. 2 is a reduced-in-size elevational view showing the nut runner partially broken away and in section;

FIG. 3 is an enlarged sectional view taken on line 3—3 of FIG. 2, looking in the direction of the arrows;

FIG. 4 is an enlarged fragmentary sectional view of the nut runner; and

Figure 1:
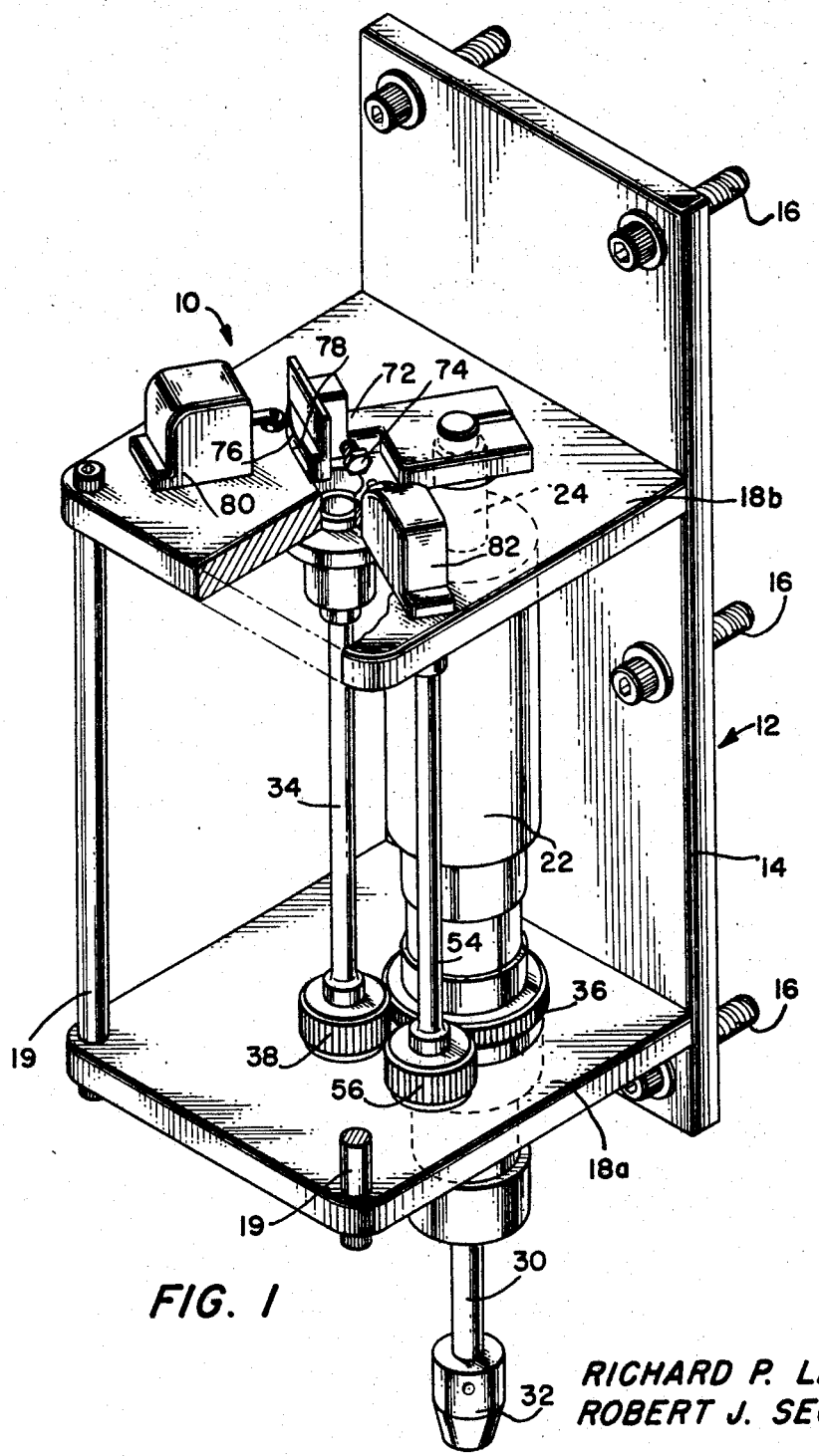
FIG. 1 is a perspective view illustrating a power operated nut runner which is constructed in accordance with the present invention.

Referring more particularly to the drawings wherein similar reference characters designate corresponding parts throughout the several views, 10 generally designates a power operated nut runner which has been shown as a preferred embodiment of the present invention. The nut runner 10 is particularly adapted for loosening a right hand threaded nut pretightened to a predetermined torque and then retightening such nut to a predetermined torque. The nut runner 10 is mounted upon a support 12 which includes a baseplate 14 adapted to be fixedly located upon a supporting surface by bolts 16, and a pair of generally upright mounting plates 18a, 18b fixedly connected to the baseplate 14 in spaced relationship and connected by tie rods 19. It will be understood that, although the support 12 has been illustrated as supporting only a single nut runner 10, it could alternatively, if desired or required, be constructed to carry two or more of the nut runners in side-by-side relationship. It will also be understood that throughout the following description the terms clockwise and counterclockwise have been employed to designate relative rotary directions as viewed in the direction of the arrow A shown being the mounting plate 18b in FIG. 2. Hence, the right hand threaded nut driven by the nut runner 10 is loosened by counterclockwise rotation and retightened by clockwise rotation.

The nut runner 10 comprises a tool casing or housing 22 which adjacent its forward end is rotatably supported on the mounting plate 18a and at its rearward end rigidly carries a stub shaft 24. The stub shaft 24 projects through an opening 20 in the mounting plate 18b and is rotatably supported by bearings 26 on the mounting plate 18b such that the tool casing 22 is, per se, freely rotatable. The tool casing 22 contains the driving means or motor of the nut runner 10, such driving means being a conventional reversible vane-type pneumatic motor designated generally as 28 in FIG. 2. The pneumatic motor 28 is connected in a suitable conventional manner to rotatably drive a driven element or tool spindle 30, shown as carrying a conventional wrench socket 32, whereby the tool spindle 30 and wrench socket 32 are conjointly driven in the same rotary direction as the rotor of the motor 28. Hence, as the pneumatic motor 28 is of the reversible type, the tool spindle 30 and wrench socket 32 are conjointly rotatable with the rotor in both clockwise and counterclockwise directions.

The driven rotation of the tool spindle 30 in each rotary direction causes reactive forces on the tool casing 22 which urge the latter to rotate in the opposing rotary direction. Thus, when the tool spindle 30 is driven in the counterclockwise direction to loosen a pretightened nut the tool casing 22 is urged in the clockwise direction; and when the tool spindle 30 is driven in the clockwise direction to retighten a nut and tool casing 22 is resultantly urged in the counterclockwise direction. The torque generated on the tool casing 22 by the reactive forces, moreover, is both measurable and a reliable indication of the torque on the tool spindle 30 and wrench socket 32. The embodiment of the present invention shown on the nut runner 10 is particularly constructed and arranged to employ this reactive torque on the tool casing 22 as an indication of the torque on the tool spindle 30 and to automatically control the operation of the pneumatic motor 28, and thereby the rotation of the tool spindle 30, in accordance with such reactive torque.

More specifically, a first torque measuring means in the form of an elongated, prestressed torsion bar 34 is positioned adjacent the tool casing 22 and arranged to extend longitudinally along the latter. The tool casing 22 fixedly carries a circumferential driving gear 36 meshing with a driven gear 38 which is rigidly mounted on the torsion bar 34 adjacent the mounting plate 18a. One end 34a of the torsion bar 34 is rotatably supported on the mounting plate 18a by bearings 40; the other end 34b of the torsion bar 34 is supported by an anchor assembly 42 affixed to the mounting plate 18b. The anchor assembly 42 includes a stationary anchoring element 44 which contains a bore 46 rotatably receiving a sleeve 51 affixed on the end 34b of the torsion bar 34 and, as shown in FIG. 3, is provided with an arcuate groove 48 receiving a tang 50 on such a sleeve 51. The groove 48 and tang 50 are relatively dimensioned to permit limited rotary movement of the end 34b of the torsion bar 34 relative to the anchoring element 44.

The torsion bar 34 is pretensioned or preloaded to restrict clockwise reactive torque on the tool casing 22 to a level corresponding to that caused by a counterclockwise torque on the tool spindle 30 sufficient to loosen a nut pretightened to a predetermined torque. The torsion bar 34 is, moreover, nonrotatably anchored at its end 34b during the application of clockwise reactive torque on the tool casing 22 ast he flange 50 is held by the shoulder 52 against counterclockwise rotation and clockwise reactive torque on the tool casing 22 attempts to rotate the torsion bar 34 in the counterclockwise direction. Hence, when the tool spindle 30 is driven in the counterclockwise direction to loosen a pretightened nut the torsion bar 34 measures the clockwise reactive torque on the tool casing 22. When, however, the tool spindle 30 is driven in the clockwise direction to tighten a nut the torsion bar 34 is inoperative to measure or restrict the resulting counterclockwise reactive torque on the tool casing 22 as the latter merely rotates the torsion bar 34 in the clockwise direction.

A second torque measuring means in the form of a second elongated, prestressed torsion bar 54 is, however, provided for measuring and restricting counterclockwise reactive torque imposed on the tool casing 22 by clockwise rotation of the tool spindle 30 to tighten a nut. The torsion bar 54 is arranged to extend longitudinally along the tool casing 22 and adjacent its end 54a rigidly carries a driven gear 56 in meshing engagement with the driving gear 36 on the tool casing 22. The end 54a of the torsion bar 54 is rotatably supported on the mounting plate 18a by bearings 58; the opposing end 54b of the torsion bar 54 is supported by an anchor assembly 60 affixed to the mounting plate 18b. The anchor assembly 60 comprises a nonrotatable anchoring element 62 containing a bore 64 rotatably receiving a sleeve 65 affixed on the end 54b and, as shown in FIG. 3, includes an arcuate groove 66 receiving a flange 68 on such sleeve 65 for limited rotary movement.

The torsion bar 54 is pretensioned or preloaded to restrict counterclockwise reactive torque on the tool casing 22 to a level corresponding to that arising from a clockwise torque on the tool spindle 30 sufficient to tighten a nut to a predetermined torque. The torsion bar 54, during the application of counterclockwise reactive torque on the tool casing 22, is nonrotatably anchored at its end 54b as the flange 68 is held by the shoulder 70 against clockwise rotation and the counterclockwise reactive torque on the tool casing 22 attempts to rotate the torsion bar 54 in the clockwise direction. Thus, when the tool spindle 30 is driven in a clockwise direction to tighten a nut the torsion bar 54 measures the counterclockwise reactive torque on the tool casing 22. When, however, the tool spindle 30 is driven in the counterclockwise direction to loosen a pretightened nut, the torsion bar 54 is inoperative to measure or restrict clockwise reactive torque, on the tool casing 22 as such clockwise reactive torque, of course, merely rotates the torsion bar 54 in the counterclockwise direction.

A control means is provided for causing the pneumatic motor 28 to reverse the direction of the rotation of the tool spindle 30 after the aforementioned predetermined clockwise reactive torque on the tool casing 22 and to also stop the rotation of the tool spindle 30 after the aforementioned predetermined counterclockwise reactive torque on the tool casing 22. This control means, as illustrated, comprises an actuating element or arm 72, keyed to the stub shaft 24 for conjoined rotation with the latter and with the tool casing 22, which carries a laterally extending, threadedly adjustable actuating screw 74 and a cam element 76 having an arcuate cam actuating surface or ramp 78. This control means, moreover, also comprises switch means including a normally open, first control switch 80 which is arranged to be closed by the actuating ramp 78 upon movement of the actuating element 72 occasioned by the aforementioned predetermined clockwise reactive torque on the tool casing 22, and a normally open, second control switch 82 which is arranged to be closed by the actuating screw 74 upon the aforementioned predetermined counterclockwise reactive torque on the tool casing 22.

Figure 5:
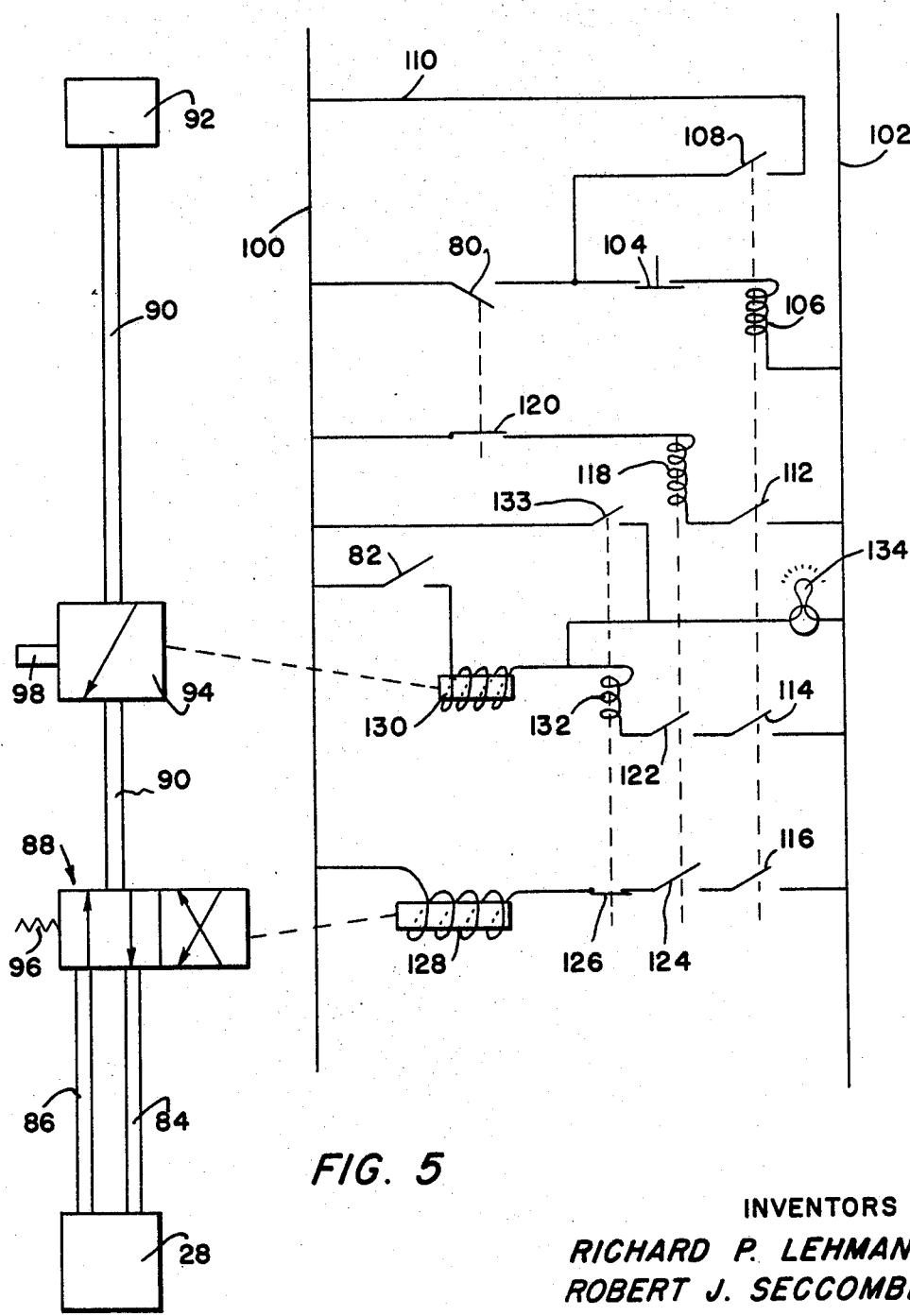
FIG. 5 is a schematic view of the control system of the illustrated nut runner.

As illustrated in FIG. 5, the reversible pneumatic motor 28 is powered to drive the tool spindle 30 in the counterclockwise direction by pressurized air supplied through a conduit 84 and to drive the tool spindle 30 in the clockwise direction by pressurized air supplied by a conduit 86, the conduits 84, 86 each serving to exhaust air from the motor 28 as the other thereof supplies pressurized air thereto. The conduits 84, 86 are alternatively connectible through a reversing valve 88 to a conduit 90 communicating with a source of reservoir 92 of pressurized air such that pressurized air from the source 92 is selectively supplied through the conduits 84, 86 as dictated by the reversing valve 88. The reversing valve 88 is spring biased by a spring 96 to a position wherein pressurized air is normally supplied through the conduit 84 to the pneumatic motor 28 to effect counterclockwise rotation of the tool spindle 30, and is shifted to a position wherein pressurized air is supplied through the conduit 86 to the motor 28 in a manner to be hereinafter described. A shutoff valve 94 is interposed in the conduit 90 for shutting off the flow of air through the latter, the shutoff valve 94 being manually actuatable by a push-button type control 98 to permit fluid flow through the conduit 90 and shifted to shutoff such flow in a manner to be hereinafter described.

As also illustrated in FIG. 5 wherein the electrical components of the control means are shown as connected to a source of electrical current by leads 100, 102, the control switch 80 is connected in an electrical circuit in series with a normally closed, manually operated reset switch 104 and a solenoid 106 such that, with the reset switch 104 closed, the closing of the control switch 80 electrically energizes the solenoid 106. The solenoid 106, in turn, is electrically connected to cause its energization to close a normally open switch 108 interposed in a shunt 110 bypassing the control switch 80, and also at such time closes the normally open switches 112, 114, 116 disposed in circuits in parallel to the circuit containing the control switch 80 and solenoid 106. The circuit containing the switch 112 also includes a solenoid 118 and a switch 120 which is interconnected to the control switch 80 such that operation of the control switch 80 automatically provides reverse operation of the switch 120 (that is, opening of the control switch 80 automatically closes the switch 120 and closing of the control switch 80 automatically opens the switch 120). The solenoid 118 is electrically connected such that its energization by the closing of the switches 112, 120 causes it to close the normally open switches 122, 124 disposed in the circuits containing the switches 114, 116, respectively. Hence, as the remaining switch 126 in the circuit containing the switches 116, 124 is normally closed, this closing of the switch 124 causes the solenoid 128 in such circuit to be energized. The solenoid 128 is connected to the reversing valve 88 such that its energization shifts the valve 88 from its illustrated position to a position in which pressurized air is supplied to the pneumatic motor 28 through the conduit 86 to cause the motor 28 to provide clockwise rotation of the tool spindle 30.

The control switch 82 is interposed in the aforementioned circuit containing the switches 114, 122 and, after the prior closing of such latter switches in the beforedescribed manner, upon its closing causes the solenoids 130, 132 in such circuit to be energized. The solenoid 132 is electrically connected to simultaneously close a switch 133 and open the aforedescribed switch 126; the solenoid 130 is connected to the valve 94 such that its energization shifts such valve 94 to close off the flow of air through the conduit 90. In addition, a light 134 in the circuit containing the control switch 82 upon the closing of the control switch 82 provides a visual indication of such closing.

During the operation of the nut runner 10, pressurized air from the source 92 is initially supplied through the conduits 90, 84 to cause the pneumatic motor 28 to drive the tool spindle 30 in the counterclockwise direction for loosening a right hand threaded nut received by the wrench socket 32. This counterclockwise rotation of the tool spindle 30, as hereinbefore described, urges the tool casing 22 in the clockwise direction. The torsion bar 34 measures the clockwise torque on the tool casing 22 whereby, when the tool spindle 30 applies a predetermined counterclockwise torque sufficient to loosen the nut from a predetermined tightness, the cam element 76 momentarily closes the control switch 80 to energize the solenoid 106. (In the event that the nut was not pretightened to the aforesaid predetermined tightness, the tool spindle 30 never attains the predetermined torque; and, hence, the operator of the nut runner 10 is alerted as the hereinafter described operation does not follow.)

The energization of the solenoid 106 causes the switches 108, 112, 114, 116 to be closed such that, when the switch 120 is reclosed by the reopening of the control switch 80, the solenoid 118 is energized. (The control switch 80 is, of course, automatically reopened after said momentary closing due to the movement of the cam element 76 therefrom upon the subsequent lesser torque on the tool spindle 30 occasioned by the succeeding loosening of the nut.) This energization of the solenoid 118 causes the switches 122, 124 to be closed and thereby energizes the solenoid 128 which shifts the reversing valve 88 against the spring 96. Thus, pressurized air from the source 92 is thereafter supplied to the motor 28 through the conduits 90, 86 to cause the motor 28 to drive the tool spindle 30 in the clockwise direction; and the nut received by the wrench socket 32 is resultantly retightened by the nut runner 10.

During the retightening of the nut, the clockwise rotation of the tool spindle 30 urges the tool casing 22 in the counterclockwise direction. Thus, then the nut is retightened to a predetermined tightness and the torque on the tool spindle 30 attains the predetermined torque determined by the torsion bar 54, the actuating screw 74 closes the control switch 82 such that the solenoids 130, 132 become energized. The energization of the solenoid 130 causes the latter to shift the valve 94 to a position in which the flow of pressurized air from the source 92 to the motor 28 is shutoff. The energization of the solenoid 132 causes the latter to open the switch 126, thereby de-energizing the solenoid 128 and allowing the spring 96 to return the reversing valve 88 to its illustrated position, and to also close the switch 133, thereby lighting the light 134 to visually alert the operator of the nut runner 10.

The nut runner 10 is reset for another operating cycle by momentarily manually opening the reset switch 104 to return the electrical portions of the control means to their illustrated initial positions, and manually shifting the valve 94 to reconnect the source 92 with the motor 28.

Having thus described our invention, we claim:

1. A power operated tool comprising:
   driving means;
   a driven element connected to said driving means to be rotated thereby in alternative opposing rotary directions;
   reaction means rotatably mounted and arranged whereby rotation of said driven element urges said reaction means to rotate in the opposing rotary direction;
   means operable, when said driven element is rotated to urge said reaction means in one rotary direction, for measuring the torque in said one rotary direction on said reaction means;
   means operable, when said driven element is rotated to urge said reaction means in the other rotary direction, for measuring the torque in said other rotary driection on said reaction means; and
   control means responsive to the measured torque on said reaction means in both rotary directions for causing the direction of rotation of said driven element to be reversed after a predetermined torque on said reaction means in said one rotary direction and causing the rotation of said driven element to be stopped after a predetermined torque on said reaction means in said other rotary direction.

2. A power operated tool according to claim 1, further comprising said driving means being a motor reversible to provide said rotation of said driven element in said alternative opposing rotary directions, said reaction means being a tool casing containing said motor, said measuring means each including a torsion bar connected to said tool casing, and said control means including an actuating element connected to said tool casing and switch means actuatable by said actuating element and arranged to cause said motor to be reversed after a predetermined torque on said tool casing in said one rotary direction and to cause said motor to be shutoff after a predetermined torque on said tool casing in said other rotary direction.

3. A power operated tool comprising:
   a rotatably mounted tool casing;
   driving means within said tool casing;
   a driven element connected to said driving means to be rotated by the latter in alternative opposing rotary directions whereby rotation of said driven element in each rotary direction urges said tool casing to rotate in the opposing rotary direction;
   first measuring means operable, when said driven element is rotated to urge said tool casing in one rotary direction, for measuring the torque in said one rotary direction on said tool casing;
   second measuring means operable, when said driven element is rotated to urge said tool casing in the other rotary direction, for measuring the torque in said other rotary direction on tool casing;
   said torque measuring means each being operable for measuring torque in only a single rotary direction on said tool casing; and
   control means responsive to the measured torque on said tool casing for controlling the rotation of said driven element, said control means causing the rotation of said driven element to be reversed in response to a lesser torque in said one rotary direction on said tool casing following a higher predetermined torque in said one rotary direction on said tool casing and said control means causing the rotation of said driven element to be stopped after a predetermined torque in said other rotary direction on said tool casing.

4. A power operated tool according to claim 3, further comprising said driving means being a motor reversible to provide said rotation of said driven element in alternative opposing rotary directions, said control means controlling said motor to reverse and stop its operation, and said torque measuring means each being a torsion bar mounted at one end for rotation in both rotary directions and at the other end mounted for rotation in only a single rotary direction, said torsion bars being connected to said tool casing to be driven thereby.

5. A power operated tool according to claim 4, further comprising said control means including actuating means connected to said tool casing and switch means actuable by said actuating means to reverse and stop said motor, said one rotary direction being the clockwise direction and said other rotary direction being the counterclockwise direction.

6. A power operated tool comprising a rotatably supported tool casing; a reversible rotary driving motor in said tool casing; a rotatable tool spindle connected to said driving motor to be rotatably driven thereby in alternative opposing rotary directions; such driven rotation of said tool spindle in each rotary direction urging said tool casing to rotate in the opposing rotary direction; a socket carried by said tool spindle; first measuring means operable, when said tool spindle is rotatably driven to urge said tool casing to rotate in the clockwise direction, for measuring the torque in the clockwise direction on said tool casing; second measuring means operable, when said tool spindle is rotatably driven to urge said tool casing to rotate in the counterclockwise direction, for measuring the torque in the counterclockwise diretcion on said tool casing; said torque measuring means each being operative to measure torque in only a single rotary direction on said tool casing; and control means for controlling the operation of said driving motor in response to the measured torque on said tool casing, said control means including means for causing the operation of said driving motor to be reversed in response to a drop in clockwise torque on said tool casing following a higher predetermined clockwise torque on said tool casing and said control means also including means for causing the operation of said driving motor to be shut off after a predetermined counterclockwise torque on said tool casing.

7. A power operated tool according to claim 6, wherein said torque measuring means each include a torsion bar gear connected to said tool casing, said torsion bars each being at one end mounted for rotation in both rotary directions and at the other end mounted for rotation in only a single rotary direction.

References Cited

UNITED STATES PATENTS

| | | | |
|---|---|---|---|
| 2,410,695 | 11/1946 | Werner | 192—142 |
| 2,685,808 | 8/1954 | Garvin | 81—52.4 |
| 2,725,918 | 12/1955 | Deshler | 173—12 X |
| 2,973,067 | 2/1961 | Eddy | 173—12 X |

ERNEST R. PURSER, Primary Examiner

U.S. Cl. X.R.

81—52.4